(12) United States Patent
Kawamura et al.

(10) Patent No.: US 12,116,432 B2
(45) Date of Patent: Oct. 15, 2024

(54) CURABLE COMPOSITION

(71) Applicant: Nitto Shinko Corporation, Sakai (JP)

(72) Inventors: Ryuji Kawamura, Sakai (JP); Hirofumi Fujii, Sakai (JP); Satoshi Okuda, Sakai (JP)

(73) Assignee: NITTO SHINKO CORPORATION, Fukui (JP)

( * ) Notice: Subject to any disclaimer, the term of this patent is extended or adjusted under 35 U.S.C. 154(b) by 148 days.

(21) Appl. No.: 17/782,276

(22) PCT Filed: Dec. 10, 2020

(86) PCT No.: PCT/JP2020/046015
§ 371 (c)(1),
(2) Date: Jun. 3, 2022

(87) PCT Pub. No.: WO2021/117804
PCT Pub. Date: Jun. 17, 2021

(65) Prior Publication Data
US 2022/0396645 A1 Dec. 15, 2022

(30) Foreign Application Priority Data
Dec. 13, 2019 (JP) .................. 2019-225772

(51) Int. Cl.
| | | |
|---|---|---|
| C08F 2/50 | (2006.01) | |
| C08F 136/06 | (2006.01) | |
| C08F 220/18 | (2006.01) | |
| C08F 220/20 | (2006.01) | |
| C08G 18/24 | (2006.01) | |
| C08G 18/62 | (2006.01) | |
| C08G 18/73 | (2006.01) | |

(52) U.S. Cl.
CPC .............. *C08F 2/50* (2013.01); *C08F 136/06* (2013.01); *C08F 220/1811* (2020.02); *C08F 220/20* (2013.01); *C08G 18/246* (2013.01); *C08G 18/6208* (2013.01); *C08G 18/73* (2013.01)

(58) Field of Classification Search
USPC ..................................... 522/90, 96, 98, 174
See application file for complete search history.

(56) References Cited

U.S. PATENT DOCUMENTS 7,547,735 B1 * 6/2009 Konarski .............. C08L 19/006
522/18
2017/0051096 A1 2/2017 Lu et al.
2020/0189236 A1 6/2020 Takahashi et al.

FOREIGN PATENT DOCUMENTS

| CN | 102985446 A | 3/2013 |
|---|---|---|
| CN | 103764701 A | 4/2014 |
| CN | 103890026 A | 6/2014 |
| CN | 109423251 A | 3/2019 |
| JP | 2012-1648 A | 1/2012 |
| JP | 2014-201593 A | 10/2014 |
| JP | 2017-179171 A | 10/2017 |
| WO | 2012/090298 A1 | 7/2012 |
| WO | 2019/069872 A1 | 4/2019 |
| WO | 2019/097887 A1 | 5/2019 |

OTHER PUBLICATIONS

Duduta, Mihai. Dielectric Elastomer Actuators as Artificial Muscles for Soft Robotic Applications. United States—Massachusetts: Harvard University, 2018. pp. 1-5 and 30 (Year: 2018).*
International Search Report dated Feb. 22, 2021, issued in counterpart International Application No. PCT/JP2020/046015 (3 pages).
Office Action dated Sep. 7, 2023, issued in counterpart CN Application No. 202080084775.5, with English translation. (15 pages).
Extended (Supplementary) European Search Report dated Oct. 11, 2023, issued in counterpart EP Application No. 20898425.2. (7 pages).
Notification of Transmittal of Translation of the International Preliminary Report on Patentability (Form PCT/IB/338) issued in counterpart International Application No. PCT/JP2020/046015 mailed Jun. 23, 2022 with Forms PCT/IB/373 and PCT/ISA/237. (12 pages).
Extended (Supplementary) European Search Report dated Nov. 10, 2023, issued in counterpart EP Application No. 20898425.2. (7 pages).

* cited by examiner

*Primary Examiner* — Sanza L. McClendon
(74) *Attorney, Agent, or Firm* — WHDA, LLP

(57) ABSTRACT

Provided is a curable composition including: a curable oligomer having, in its molecule, a branched polyolefin structure and a (meth)acryloyl group; a saturated cycloalkyl (meth)acrylate monomer having, in its molecule, a saturated cyclic hydrocarbon structure and a (meth)acryloyl group; and a saturated chain alkyl (meth)acrylate monomer having, in its molecule, a saturated chain hydrocarbon structure and a (meth)acryloyl group.

8 Claims, 1 Drawing Sheet

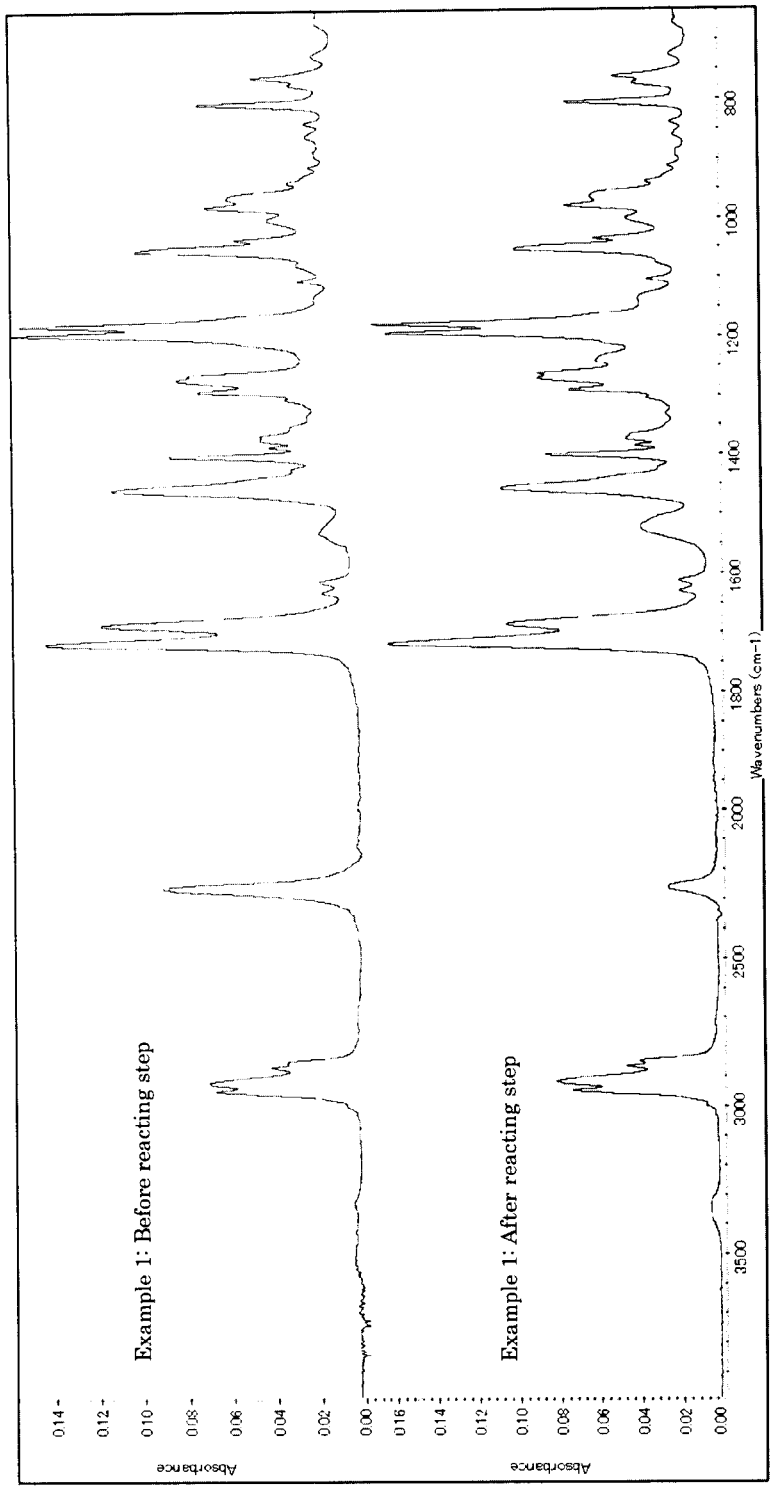

CURABLE COMPOSITION

CROSS-REFERENCE TO RELATED APPLICATION

This application claims priority to Japanese Patent Application No. 2019-225772, the disclosure of which is incorporated herein by reference in its entirety.

FIELD

The present invention relates to a curable composition that is cured by curing treatment such as irradiation with light.

BACKGROUND

Conventionally, for example, known is a curable composition that includes: a urethane resin having a hydrogenated butadiene-based skeleton and/or a hydrogenated isoprene-based skeleton; a monofunctional (meth)acrylate monomer having no ring structure and having an alkyl group with 10 or less carbon atoms; and a photopolymerization initiator. The curable composition of this type is, for example, applied to an electronic circuit followed by being cured by irradiation with light such as ultraviolet rays to be used in an application of coating the electronic circuit.

As the curable composition of this type, known is a curable composition with the urethane resin being a specific polymer (for example, Patent Literature 1). In the curable composition disclosed in Patent Literature 1, the aforementioned urethane resin is a polymer of: an alcohol (a1) that includes a polyol (a1-1) including a hydrogenated polybutadiene polyol and/or a hydrogenated polyisoprene polyol; and polyisocyanate (a2). The equivalence ratio of an isocyanate group in the polyisocyanate (a2) to a hydroxy group in the alcohol (a1) (isocyanate group/hydroxy group) is more than 1 and 8 or less. The polyisocyanate (a2) includes polyisocyanate having, in one molecule, 2 to 6 monocyclic alicyclic structures or 3 to 7 monocyclic aromatic rings.

In the curable composition disclosed in Patent Literature 1, the monofunctional (meth)acrylate monomers described above react with each other by the irradiation with light such as ultraviolet rays to be polymerized, thereby forming a cured film. Further, in the curable composition disclosed in Patent Literature 1, the isocyanate groups of the urethane resin react with each other by moisture in air to allow polymerization to proceed. Accordingly, a cured film cured by both irradiation with light and moisture can be obtained. The curable composition disclosed in Patent Literature 1 enables a cured film having a certain level of electrical insulation to be obtained.

CITATION LIST

Patent Literature

Patent Literature 1: JP 2017-179171 A

SUMMARY

Technical Problem

However, the curable composition disclosed in Patent Literature 1 has a problem that a cured film (cured product) having good elongation properties is hardly obtainable. The cured product having insufficient elongation properties has a risk of occurrence of cracks under the environment in which, for example, the cured product is repeatedly exposed to a high temperature and a low temperature.

In view of the above problems and the like, it is an object of the present invention to provide a curable composition capable of obtaining a cured product having both good electrical insulation properties and good elongation properties.

Solution to Problem

In order to solve the above problem, a curable composition according to the present invention includes: a curable oligomer having, in its molecule, a branched polyolefin structure and a (meth)acryloyl group: a saturated cycloalkyl (meth)acrylate monomer having, in its molecule, a saturated cyclic hydrocarbon structure and a (meth)acryloyl group; and a saturated chain alkyl(meth)acrylate monomer having, in its molecule, a saturated chain hydrocarbon structure and a (meth)acryloyl group.

In the curable composition according to the present invention, it is preferable that the saturated chain alkyl(meth) acrylate monomer be a saturated branched alkyl (meth) acrylate monomer having, in its molecule, a saturated branched hydrocarbon structure and a (meth)acryloyl group.

In the curable composition according to the present invention, it is preferable that the saturated chain alkyl(meth) acrylate monomer be a (meth)acrylate monomer including saturated chain hydrocarbon having 9 or more and 12 or less carbon atoms. It is preferable that the curable composition according to the present invention further include an isocyanate monomer having, in its molecule, one or more isocyanate groups.

In the curable composition according to the present invention, it is preferable that a ratio of the saturated cycloalkyl (meth)acrylate monomer to 100 parts by mass of a total mass of the saturated cycloalkyl(meth)acrylate monomer and the saturated chain alkyl (meth)acrylate monomer be preferably 70 parts or more and 95 parts or less by mass.

BRIEF DESCRIPTION OF DRAWINGS

FIG. 1 is a view showing IR charts analyzed by FT-IR.

DESCRIPTION OF EMBODIMENTS

Hereinafter, an embodiment of a curable composition according to the present invention will be described.

A curable composition of this embodiment includes: a curable oligomer having, in its molecule, a branched polyolefin structure and a (meth)acryloyl group; a saturated cycloalkyl (meth)acrylate monomer having, in its molecule, a saturated cyclic hydrocarbon structure and a (meth)acryloyl group; and a saturated chain alkyl (meth)acrylate monomer having, in its molecule, a saturated chain hydrocarbon structure and a (meth)acryloyl group.

According to the curable composition described above, a cured product having both good electrical insulation properties and good elongation properties can be obtained.

The curable oligomer is not particularly limited as long as it is a compound having, in its molecule, a branched polyolefin structure and at least one (meth)acryloyl group. In this embodiment, the curable oligomer has a branched polyolefin structure, a (meth)acryloyl group, and an isocyanate group in the molecule. A specific description will be hereinafter given on such a curable oligomer.

The curable oligomer included in the curable composition has a (meth)acryloyl group in the molecule. The saturated cycloalkyl (meth)acrylate monomer and the saturated chain alkyl(meth)acrylate monomer, which are included in the curable composition, each have a (meth)acryloyl group in the molecule. This configuration allows polymerization (curing reaction) of the curable composition to proceed by polymerization reaction such as radical polymerization when the curable composition is irradiated with light such as ultraviolet rays, thereby being capable of obtaining a cured product that has been sufficiently cured. Some of the curable oligomers can further have at least one isocyanate group (—NCO) in the molecule. This configuration causes a reaction between —NCOs of the curable oligomers also by moisture in air to bond the curable oligomers. Since this bonding also causes curing of the curable composition to proceed, the cured product that has been sufficiently cured can be obtained. Thus, the curable composition of this embodiment can be cured by light, and can be sufficiently cured also by moisture when the curable oligomer has the —NCO group in the molecule. The curable composition of this embodiment includes the saturated cycloalkyl (meth) acrylate monomer having the saturated cyclic hydrocarbon structure in the molecule, and can thus have sufficient moisture resistance after being cured. Further, the curable composition of this embodiment includes a saturated chain alkyl (meth)acrylate monomer having the saturated chain hydrocarbon structure in the molecule, and thus enables the cured product to have sufficient elongation properties. It is preferable that the curable oligomer have neither a benzene ring structure (i.e., an aromatic hydrocarbon composed of six cyclic carbon atoms) nor a saturated cyclic hydrocarbon structure in the molecule.

Examples of the curable oligomer include a compound represented by a general formula (1) below:

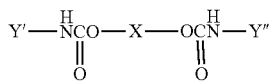

General formula (1)

[In the general formula (1), X represents a branched polyolefin structure, and Y' and Y" each represent any of general formulae (a) to (d) below. In each of the general formulae (a) to (d), $Z^1$ and $Z^2$ each independently represent a molecular structure represented by a general formula ($\alpha$) below or represent —NCO, and at least one of two $Z^1$ and two $Z^2$ in Y' and Y" is the molecular structure represented by the general formula ($\alpha$) below.]

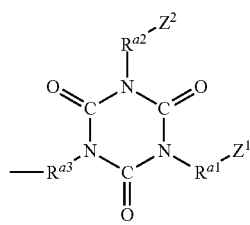

General formula (a)

[In the general formula (a), R, $R^{a2}$, and $R^{a3}$ each independently represent an organic group, and $Z_1$ and $Z^2$ are as described above.]

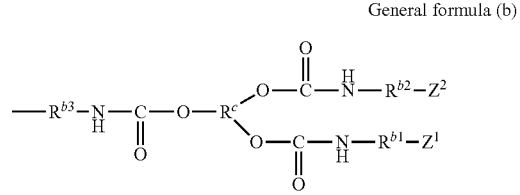

General formula (b)

[In the general formula (b), $R^{b1}$, $R^{b2}$, $R^{b3}$, and $R^c$ each independently represent an organic group, and $Z_1$ and $Z^2$ are as described above.]

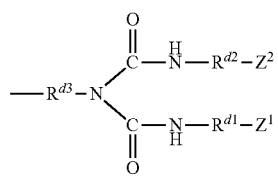

General formula (c)

[In the general formula (c), $R^{d1}$, $R^{d2}$, and $R^{d3}$ each independently represent an organic group, and $Z_1$ and $Z^2$ are as described above.]

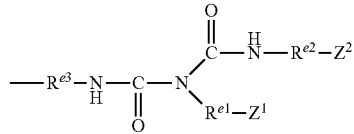

General formula (d)

[In the general formula (d), $R^{e1}$, $R^{e2}$, and $R^{e3}$ each independently represent an organic group, and $Z_1$ and $Z^2$ are as described above.]

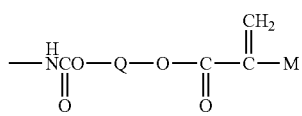

General formula ($\alpha$)

[In the general formula ($\alpha$), Q represents a saturated hydrocarbon group having 2 to 4 carbon atoms, and M represents H or $CH_3$.]

In the general formula (1), X is a branched polyolefin structure. The polyolefin of such a moiety is preferably a saturated polyolefin. That is, the polyolefin in X is preferably a branched saturated polyolefin. Examples of the branched saturated polyolefin include hydrogenated polybutadiene.

The polyolefin structure in the general formula (1) preferably has a molecular weight of 1000 or more and 6000 or less. Such a molecular weight being 1000 or more can further suppress the mechanical characteristics of the cured product from deteriorating. Such a molecular weight being 6000 or less can further suppress the cured product from being phase-separated and becoming uneven. The molecular weight in the polyolefin structure can be obtained in terms of a standard polystyrene conversion by GPC (gel permeation chromatography) measurement before the curable oligomer of the general formula (1) is synthesized.

In the general formula (1), Y' and Y" each include an isocyanurate structure, an adduct structure, or a biuret structure, of aliphatic diisocyanate having 6 to 10 total carbon atoms. In other words, for example, a moiety of the structure represented by the general formula (a) from which $Z_1$ and $Z^2$ are removed is the isocyanurate structure, a moiety of the structure represented by the general formula (b) from which $Z_1$ and $Z^2$ are removed is the adduct structure, and a moiety of the structure represented by the general formula (c) or (d) from which $Z_1$ and $Z^2$ are removed is the biuret structure.

The aliphatic diisocyanate having 6 to 10 total carbon atoms before forming the isocyanurate structure, the adduct structure, or the biuret structure has an isocyanate group at each of both ends of a linear alkylene group having 4 to 8 carbon atoms. Y' and Y" are each composed of, for example, the isocyanate structure, the adduct structure, or the biuret structure, of the aliphatic diisocyanate, and thus each have neither a benzene ring structure nor a saturated cyclic hydrocarbon structure (i.e., a saturated structure having a ring composed only of carbon atoms). Y' and Y" are each composed of the isocyanurate structure, the adduct structure, or the biuret structure, of the aliphatic diisocyanate, and thus each have neither the benzene ring structure nor the cycloalkyl structure, and the curable oligomer has neither the benzene ring structure nor the cycloalkyl structure in the molecule. Y' and Y" having neither the benzene ring structure nor the cycloalkyl structure allow the cured product after being cured to have good moisture resistance or good weather resistance.

Examples of the aliphatic diisocyanate having 6 to 10 total carbon atoms include hexamethylene diisocyanate (HMDI).

The isocyanurate product is a trimer of the aliphatic diisocyanate. For example, the structure of such a trimer from which a terminal —NCO is removed corresponds to the structure of the general formula (a) from which $Z^1$ and $Z^2$ are removed.

The adduct product is a reactant between the aliphatic diisocyanate and a triol having 3 to 6 carbon atoms. For example, the structure of such a reactant from which a terminal —NCO is removed corresponds to the structure of the general formula (b) from which $Z_1$ and $Z^2$ are removed. The triol having 3 to 6 carbon atoms includes, as elements, only carbon (C), oxygen (O), and hydrogen (H). Examples of the triol having 3 to 6 carbon atoms include trimethylolpropane ($CH_3$—$CH_2$—$C(CH_2$—$OH)_3$) and glycerin.

The biuret product is a reactant between the aliphatic diisocyanate and water or a tertiary alcohol. For example, the structure of a moiety of such a reactant inside a terminal —NCO corresponds to the structure of the general formula (c) or the general formula (d) from which $Z_1$ and $Z^2$ are removed.

In the general formula (1), Y' and Y" can have the same molecular structure as each other, and can have different molecular structures from each other. In the general formulae (a) to (d), $R^{a1}$ to $R^{a3}$, $R^{b1}$ to $R^{b3}$, $R^c$, $R^{d1}$ to $R^{d3}$, and $R^{e1}$ to $R^{e3}$ each are an organic group at least having carbon atoms. $R^{a1}$ to $R^{a3}$, $R^{b1}$ to $R^{b3}$, $R^c$, $R^{d1}$ to $R^{d3}$, and $R^{e1}$ to $R^{e3}$ each can include a urea bond, a biuret bond, or an allophanate bond. $R^{a1}$ to $R^{a3}$, $R^{b1}$ to $R^{b3}$, $R^{d1}$ to $R^{d3}$, and $R^{e1}$ to $R^{e3}$ each are preferably a saturated hydrocarbon having 4 to 8 carbon atoms, more preferably a linear saturated hydrocarbon having 6 carbon atoms, but each can have heteroatoms (e.g., N, O, S, or P), and each can have a branched structure. $R^c$ is preferably a saturated hydrocarbon having 4 to 8 carbon atoms, and is preferably a branched saturated hydrocarbon having 6 carbon atoms, but can have heteroatoms (e.g., N, O, S, or P), and can have a linear structure.

In the general formulae (a) to (d), $Z_1$ and $Z^2$ each independently represent a molecular structure represented by the general formula ($\alpha$) above, or —NCO. At least one of two $Z_1$ and two $Z^2$ is a molecular structure represented by the general formula ($\alpha$) above. In other words, the curable oligomer represented by the general formula (1) has, in its molecule, at least one molecular structure represented by the general formula ($\alpha$). Of two $Z_1$ and two $Z^2$, it is preferable that at least one (moiety) be the molecular structure represented by the general formula ($\alpha$) above and at least one (all the remaining moiety) be —NCO. In other words, it is preferable that the curable oligomer represented by the general formula (1) has, in its molecule, at least one molecular structure represented by the general formula ($\alpha$) and at least one —NCO. All of two $Z_1$ and two $Z^2$ can be the molecular structures represented by the general formula ($\alpha$). In other words, the configuration can be such that the curable oligomer represented by the general formula (1) has, in its molecule, four molecular structures represented by the general formula (a) and has no-NCO therein.

In the general formula (1), $Z^1$ and $Z^2$ can be the same as each other, or can be different from each other. Further, since in the general formula (1), Y' and Y" each include $Z^1$ and $Z^2$, the general formula (1) includes two $Z^1$ and two $Z^2$. The two $Z^1$ can be the same as each other, or can be different from each other. The same applies to the two $Z^2$. In other words, the two $Z^1$ and the two $Z^2$ each are individually defined independently from each other.

In the general formula (a), a saturated hydrocarbon group of Q having 2 to 4 carbon atoms is preferably linear. In other words, Q is preferably a linear saturated hydrocarbon group having 2 to 4 carbon atoms. The number of carbon atoms of the saturated hydrocarbon group in Q is preferably 2.

Examples of the curable oligomer represented by the general formula (1) include compounds represented by general formulae (1a) to (1f) below:

General formula (1a)

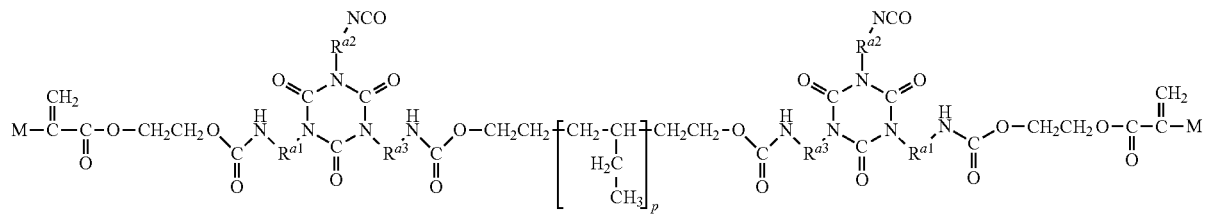

[where $R^{a1}$, $R^{a2}$, and $R^{a3}$ each independently represent an organic group and are preferably a linear saturated hydrocarbon having 4 to 8 carbon atoms, p is from 20 to 300, and M is each independently H or $CH_3$.]

General formula (1b)

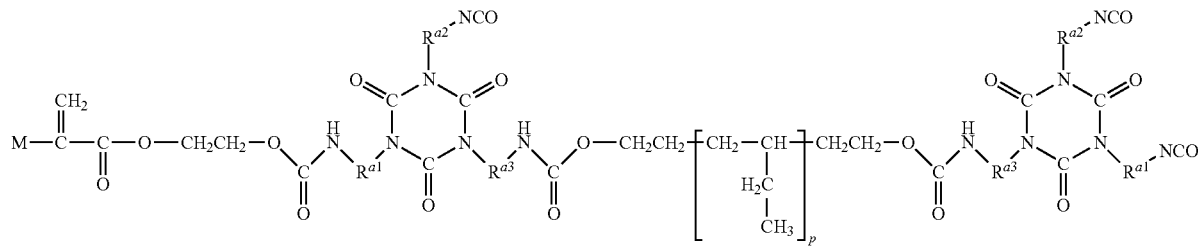

[where $R^{a1}$, $R^{a2}$, and $R^{a3}$ each independently represent an organic group and are preferably a linear saturated hydrocarbon having 4 to 8 carbon atoms, p is from 20 to 300, and M is each independently H or $CH_3$.]

General formula (1c)

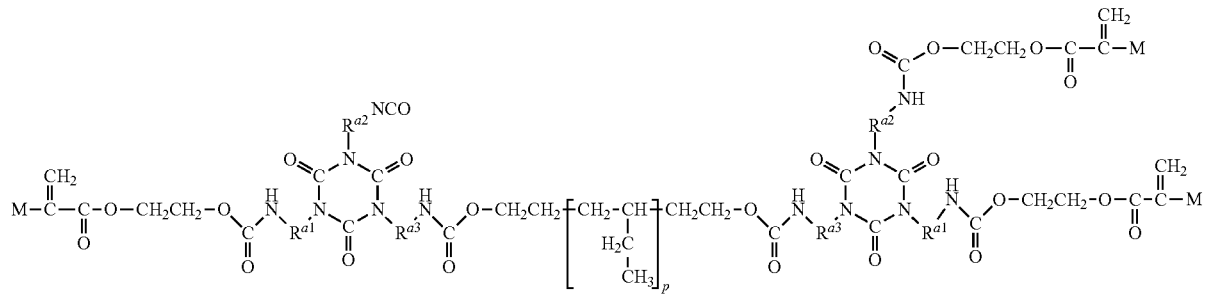

[where $R^{a1}$, $R^{a2}$, and $R^{a3}$ each independently represent an organic group and are preferably a linear saturated hydrocarbon having 4 to 8 carbon atoms, p is from 20 to 300, and M is each independently H or $CH_3$.]

General formula (1d)

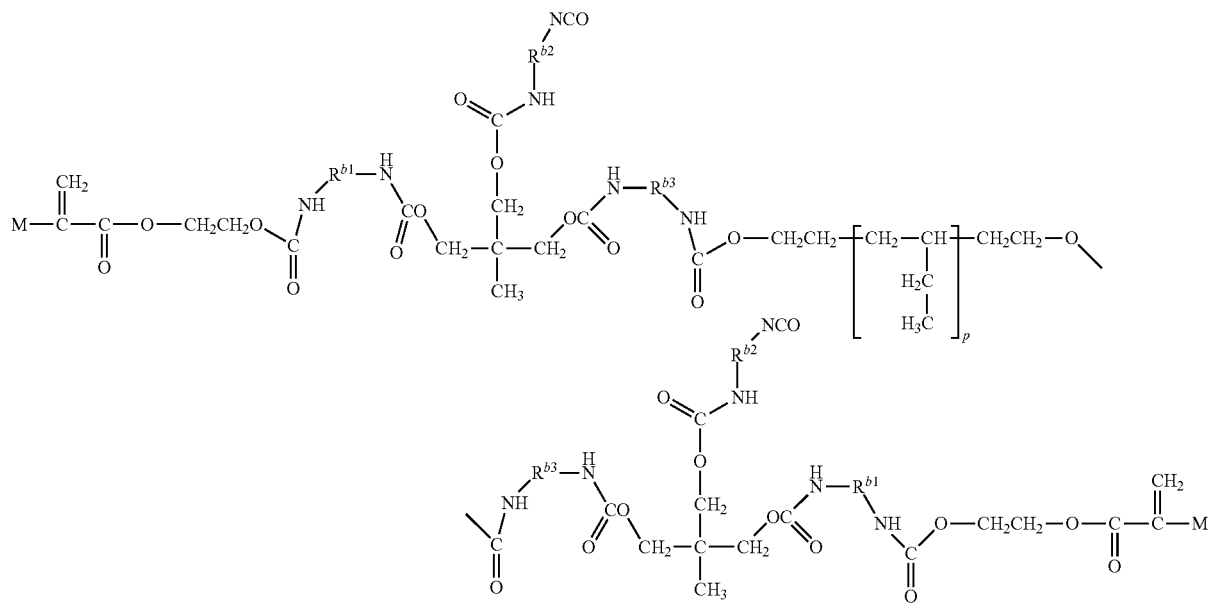

[where $R^{b1}$, $R^{b2}$, and $R^{b3}$ each independently represent an organic group and are preferably a linear saturated hydrocarbon having 4 to 8 carbon atoms, p is from 20 to 300, and M is each independently H or $CH_3$.]

General formula (1e)

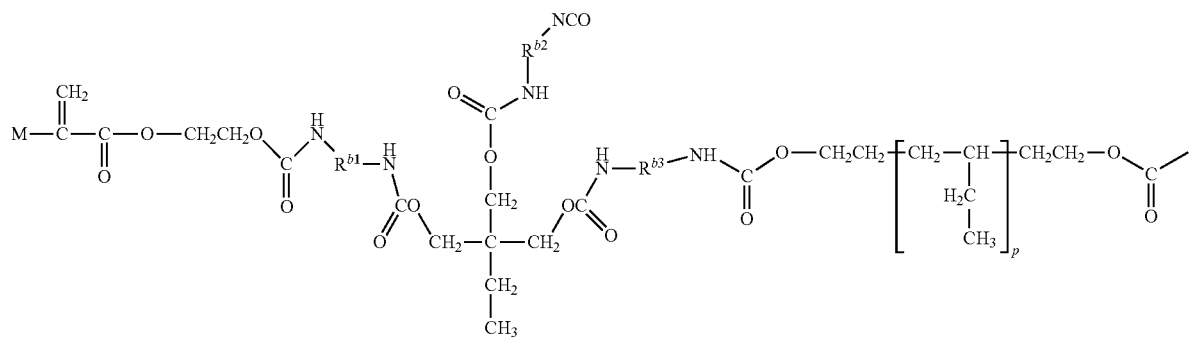

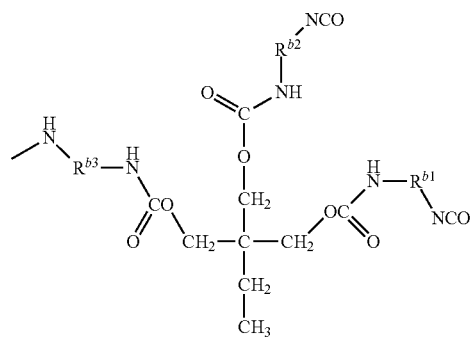

[where $R^{b1}$, $R^{b2}$, and $R^{b3}$ each independently represent an organic group and are preferably a linear saturated hydrocarbon having 4 to 8 carbon atoms, p is from 20 to 300, and M is each independently H or $CH_3$.]

General formula (1f)

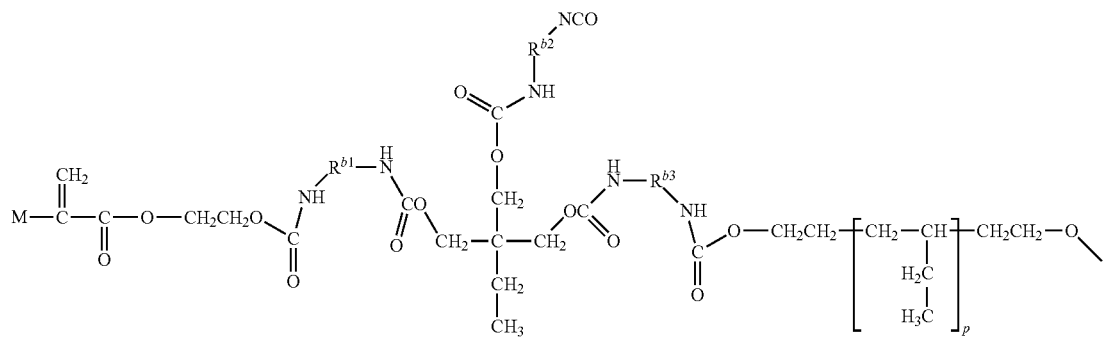

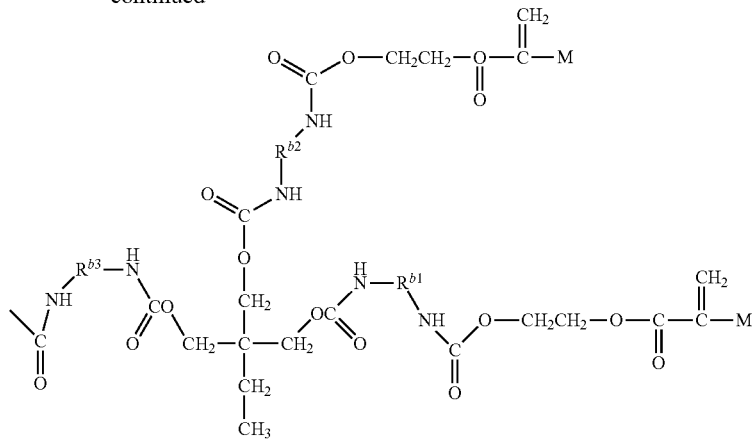

[where $R^{b1}$, $R^{b2}$, and $R^{b3}$ each independently represent an organic group and are preferably a linear saturated hydrocarbon having 4 to 8 carbon atoms, p is from 20 to 300, and M is each independently H or $CH_3$.]

As the molecular structure represented by the general formula (a), the structure represented by a formula (a-1) below is preferable. The molecular structure represented by the formula (α-1) below has an ethylene group with little steric hindrance, and thus has an advantage of increasing the polymerization rate by irradiation with ultraviolet rays or the like. When the number of carbon atoms of Q in the general formula (α) is 1 (that is, a methylene group), decomposition easily occurs at the time of curing.

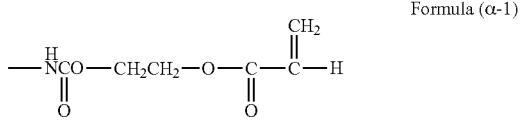

Formula (α-1)

The curable composition of this embodiment includes, for example, a urethanization reaction product of: a branched polyolefin diol (hereinafter referred to simply as <component A>); at least one selected from the isocyanurate product, the adduct product, and the biuret product, of the aliphatic diisocyanate having 6 to 10 total carbon atoms (hereinafter referred to simply as <component B>); and a hydroxy saturated $C_1$ to $C_4$ alkyl (meth)acrylate (hereinafter referred to simply as <component C>). In other words, the curable composition of this embodiment includes, for example: the curable oligomer obtained by subjecting at least the <component A>, the <component B>, and the <component C> to a urethanization reaction; the saturated cycloalkyl (meth)acrylate monomer; and the saturated chain alkyl (meth)acrylate monomer.

The curable oligomer is a moiety of the urethanization reaction product of at least the <component A>, the <component B>, and the <component C>. In other words, the curable oligomer can be obtained by a urethanization reaction of at least the <component A>, the <component B>, and the <component C>.

For example, the curable composition of this embodiment includes, as the above urethanization reaction product, at least the curable oligomer represented by the general formula (1) above. The curable composition of this embodiment includes, in addition to the curable oligomer represented by the general formula (1) above, a byproduct generated by the urethanization reaction. The curable composition of this embodiment father includes a trace amount of a urethanization reaction catalyst mixed for the urethanization reaction. Note that the urethanization reaction product will be described in detail later.

The curable composition of this embodiment, which includes at least the curable oligomer represented by the general formula (1) above, can be cured by light as aforementioned. When the curable oligomer also has a —NCO group, the curable composition of this embodiment is not only cured by light but can also be sufficiently cured by moisture. The curable composition of this embodiment also includes the byproduct generated by the urethanization reaction, and the byproduct, which can also cause a curing reaction by irradiation with light or moisture, is not only cured by light but can also be sufficiently cured by moisture.

<Component A>

The component A is a branched polyolefin diol. A polyolefin diol has a molecule having each of both ends provided with a hydroxy group. The olefin moiety has no polar group such as an ether group or an ester group, and is composed only of a saturated hydrocarbon.

Examples of the component A include polypropylenediol, polybutenediol (hydrogenated 1,2-polybutadienediol), and hydrogenated polyisoprenediol. As the component A, polybutenediol (hydrogenated 1,2-polybutadienediol) is preferable in terms of being capable of imparting sufficient mechanical flexibility to the cured product (film) after being cured.

The component A has a molecular weight of preferably 1000 or more and 6000 or less.

<Component B>

The component B is polyisocyanate, and is at least one selected from the isocyanurate product, the adduct product, and the biuret product, of the aliphatic diisocyanate having 6 to 10 total carbon atoms. The component B has three or four isocyanate groups in the molecule. It is preferable that the component B have, in the molecule, neither the benzene ring structure (aromatic ring structure) nor the saturated cyclic hydrocarbon structure (saturated cyclic structure with a ring composed only of carbon atoms).

The isocyanurate product as the component B is, for example, the trimer of hexamethylene diisocyanate (HMDI) described above, and has three isocyanate groups in the molecule.

The adduct product as the component B is, for example, a reactant of trimethylolpropane and an aliphatic diisocyanate having 6 to 10 total carbon atoms (such as HMDI described above). Such an adduct product has three isocyanate groups in the molecule.

As the component B, an adduct product in which hexamethylene diisocyanate (HMDI) and trimethylolpropane react with each other, or an isocyanurate product (trimer) of hexamethylene diisocyanate (HMDI) is preferable because it has no benzene ring and thus has good weather resistance after being cured, and because it has good solubility in a diluent when the diluent coexists in the urethanization reaction.

<Component C>

The component C is a $C_1$ to $C_4$ saturated alkyl ester of a (meth)acrylic acid, which has one hydroxy group bonded to any carbon of the alkyl moiety. The component C is preferably a hydroxy saturated $C_2$ to $C_3$ alkyl (meth)acrylate.

Examples of the component C include 2-hydroxyethyl (meth)acrylate, 2-hydroxypropyl(meth)acrylate, 3-hydroxypropyl(meth)acrylate, 2-hydroxybutyl(meth)acrylate, and 4-hydroxybutyl(meth)acrylate. In terms of having better polymerizability by irradiation with light, the component C is preferably 2-hydroxyethyl(meth)acrylate, more preferably 2-hydroxyethylacrylate.

The molar ratio of the component B to the component A in the urethanization reaction is preferably 2.0 or more and 2.5 or less, more preferably 2.0 or more and 2.2 or less.

The molar ratio of the component C to the component B in the urethanization reaction is preferably 0.5 or more and 2.0 or less, more preferably 0.5 or more and 1.5 or less.

The molar ratio of the component C to the component A in the urethanization reaction is preferably 1.0 or more and 4.0 or less, more preferably 1.0 or more and 3.0 or less.

<Urethanization Reaction Catalyst>

As the urethanization reaction catalyst, a metal-based catalyst, which is an organotin catalyst such as dibutyltin dilaurate or stannous octoate, an acetylacetonate complex catalyst, or the like, can be used. Further, as the urethanization reaction catalyst, a tertiary amine catalyst can be used.

The curable composition (curing composition) of this embodiment includes the urethanization reaction product generated by a urethanization reaction in the presence of the component A, the component B, and the component C.

Examples of the urethanization reaction product include a compound represented by the general formula (1) above, such as the compounds represented by the general formulae (1a) to (1f) above.

Further, examples of the urethanization reaction product include a compound having only an isocyanate group as a reactive group, and a compound having only a hydroxy group as a reactive group. In another aspect, examples of the urethanization reaction product include a compound that is a urethanization reaction product between the component A and the component B and has no component C introduced into the molecule, and a compound that is a urethanization reaction product between the component B and the component C and has no component A introduced into the molecule.

The curable composition of this embodiment further includes a photopolymerizable monomer that does not undergo a urethanization reaction. The photopolymerizable monomer that does not undergo a urethanization reaction has, for example, no active hydrogen in the molecule. Such a photopolymerizable monomer can be mixed as a diluent before the urethanization reaction to reduce the viscosity in the urethanization reaction system, and can be mixed after the urethanization reaction. Specifically, the curable composition of this embodiment includes at least the following two kinds of monomers as the photopolymerizable monomer that does not undergo a urethanization reaction. These monomers are compounds that produce a polymerization reaction product by being irradiated with light. Examples of the two kinds of monomers include a saturated cycloalkyl (meth)acrylate monomer having, in its molecule, a saturated cyclic hydrocarbon structure and a (meth)acryloyl group, and a saturated chain alkyl (meth)acrylate monomer having, in its molecule, a saturated chain hydrocarbon structure and a (meth)acryloyl group.

It is preferable that the saturated cycloalkyl(meth)acrylate monomer be an esterified compound of: a univalent alcohol having the saturated cyclic hydrocarbon structure (i.e., the structure of a cyclic moiety formed only of carbon atoms); and a (meth)acrylic acid. The number of carbon atoms of the univalent alcohol having the saturated cyclic hydrocarbon structure is preferably 8 or more and 15 or less. It is preferable that the saturated cycloalkyl (meth)acrylate monomer have none of benzene rings, ether bonds ($-CH_2-O-CH_2-$), and polar groups such as an $-OH$ group and a $-COOH$ group in the molecule. The saturated cycloalkyl (meth)acrylate monomer is preferably a monofunctional monomer having one (meth)acrylate group in the molecule. In the saturated cycloalkyl (meth)acrylate monomer, the saturated cyclic hydrocarbon structure can be a structure including no heteroatoms and having a carbon ring formed of 4 to 8 carbon atoms. The saturated cycloalkyl (meth)acrylate monomer can be monocyclic, bicyclic, or polycyclic. A bicyclic or polycyclic saturated cyclic hydrocarbon structure can share two or more carbon atoms. In the saturated cycloalkyl (meth)acrylate monomer, a methyl group or an ethyl group can be further bonded to the carbon of the saturated cyclic hydrocarbon structure. As the saturated cycloalkyl (meth)acrylate monomer, a monomer including a norbornane structure is preferable. Specifically, examples of the saturated cycloalkyl (meth)acrylate monomer include isobornyl (meth)acrylate (having the norbornane structure), dicyclopentenyl (meth)acrylate, adamantyl (meth)acrylate, tricyclodecane (meth)acrylate, dicyclopentadiene oxyethyl (meth)acrylate, dicyclopentanyl (meth)acrylate, tetrahydrofurfuryl (meth)acrylate, morpholine (meth)acrylate, and dicyclopentanyl di(meth)acrylate. Since the curable composition includes the saturated cycloalkyl (meth)acrylate monomer, such a saturated cycloalkyl (meth)acrylate monomer can more sufficiently dissolve the curable oligomer in the curable composition.

The saturated chain alkyl (meth)acrylate monomer is preferably a (meth)acrylate monomer having 11 or more and 19 or less carbon atoms in the molecule (i.e., saturated chain hydrocarbon having 8 or more and 15 or less carbon atoms), and more preferably a (meth)acrylate monomer having 12 or more and 16 or less carbon atoms in the molecule (i.e., saturated chain hydrocarbon having 9 or more and 12 or less carbon atoms). The monomer of this type has a high and stable flash point, and has good handleability. It is preferable that the saturated chain alkyl (meth)acrylate monomer have none of benzene rings, ether bonds ($-CH_2-O-CH_2-$), and polar groups such as an $-OH$ group and a $-COOH$ group in the molecule. The saturated chain alkyl (meth) acrylate monomer is preferably a monofunctional monomer having one (meth)acrylate group in the molecule. In the saturated chain alkyl (meth)acrylate monomer, the saturated chain hydrocarbon structure can be a saturated chain hydrocarbon structure including no atoms other than C and H and composed of 7 to 11 carbon atoms. The above curable composition including the saturated chain alkyl (meth)acrylate monomer can further increase the flexibility of a cured product obtained by curing the curable composition.

In the saturated chain alkyl (meth)acrylate monomer, the saturated chain hydrocarbon structure can be linear, and can be branched. In other words, the saturated chain hydrocarbon structure can be a saturated linear hydrocarbon structure, and can be a saturated branched hydrocarbon structure. Further in other words, the saturated chain alkyl (meth) acrylate monomer can be a saturated linear alkyl (meth) acrylate monomer, and can be a saturated branched alkyl (meth)acrylate monomer. As the saturated chain alkyl (meth) acrylate monomer, the saturated branched alkyl (meth)acrylate monomer is preferable in that the above curable oligomer can be more sufficiently dissolved in the curable composition. With this configuration, the saturated chain alkyl (meth)acrylate monomer has a saturated branched chain alkyl group, and thus has an increased compatibility with the curable oligomer having the branched polyolefin structure in the curable composition. The curable composition accordingly has a further increased uniformity, and a cured product film in a more approximately uniform state can be obtained without being much affected by the base material carrying the cured product, the thickness of the cured product, the conditions for a curing reaction, or the like.

In the curable composition of this embodiment, the ratio of the saturated cycloalkyl (meth)acrylate monomer to 100 parts by mass of the total mass of the saturated cycloalkyl (meth)acrylate monomer and the saturated chain alkyl (meth)acrylate monomer is preferably 70 parts or more and 95 parts or less by mass. Thus, it is possible to obtain the cured product having the electrical insulation properties and elongation properties with better balance.

The hydrocarbon structure of the saturated linear alkyl (meth)acrylate monomer can be a saturated linear alkyl structure. Specifically, examples of the saturated linear alkyl (meth)acrylate monomer include n-heptyl (meth)acrylate, n-octyl (meth)acrylate, n-nonyl(meth)acrylate, and n-decyl (meth)acrylate.

The hydrocarbon structure of the saturated branched alkyl(meth)acrylate monomer can be a saturated branched alkyl structure, and can be an iso structure, a sec structure, a neo structure, or a tert structure. Specifically, examples of the saturated branched alkyl (meth)acrylate monomer include isoheptyl (meth)acrylate, isooctyl (meth)acrylate, isononyl (meth)acrylate, isodecyl (meth)acrylate, and 2-ethylhexyl (meth)acrylate. As the saturated branched alkyl (meth)acrylate monomer, at least one of isononyl (meth) acrylate or isodecyl(meth)acrylate is preferable in terms of better solubility with the curable oligomer, and in terms of easily obtaining a cured film more approximate to the uniform state.

The curable composition of this embodiment can include an unreacted component A, an unreacted component B, and an unreacted component C, which have not undergone a urethanization reaction. The curable composition of this embodiment can include the urethanization reaction catalyst mixed for accelerating a urethanization reaction. As described above, the curable composition of this embodiment includes various reaction products and unreacted products. However, since the molecular structures of the compounds before the urethanization reaction are specified and the product resulting from the urethanization reaction can be sufficiently expected, it is sufficiently possible to expect the molecular structures of the reaction products (main product, byproduct). It would, however, not be practical to specify the molecular structures of the compounds other than the main reaction product. In other words, since there are many kinds of compounds included in the curable composition of this embodiment, it would be rather impractical to directly specify the structures or characteristics of all these compounds.

The curable composition of this embodiment can include a photopolymerizable monomer, an isocyanate monomer having one or more isocyanate groups in the molecule, a photopolymerization initiator, and the like, which are further added after the urethanization reaction. Examples of the photopolymerizable monomer include the saturated cycloalkyl (meth)acrylate monomer and the saturated chain alkyl (meth)acrylate monomer, which have been described above, and other photopolymerizable monomers except these (i.e., other photopolymerizable monomers that do not undergo a urethanization reaction).

Examples of the other photopolymerizable monomers that do not undergo a urethanization reaction include a monofunctional (meth)acrylate monomer and a polyfunctional (meth)acrylate monomer, as will be described below. Examples of the monofunctional (meth)acrylate monomer include phenyloxyethyl(meth)acrylate, phenoxypolyethylene glycol (meth)acrylate, benzyl (meth)acrylate, lauryl (meth)acrylate, stearyl (meth)acrylate, tridecyl (meth)acrylate, and ethoxydiethylene glycol (meth)acrylate. Examples of the polyfunctional (meth)acrylate monomer include neopentyl glycol di(meth)acrylate, polyethylene glycol di(meth) acrylate, 1,6-hexanediol di(meth)acrylate, polypropylene glycol di(meth)acrylate, ethylene oxide modified bisphenol A di(meth)acrylate, ethylene oxide modified trimethylol propane tri(meth)acrylate, ethylene oxide modified pentaerythritol tetra(meth)acrylate, tris[(meth)acryloxyethyl] isocyanurate, ethylene oxide modified dipentaerythritol hexa(meth)acrylate, and epoxy (meth)acrylate. One of these monomers can be individually used, or two or more of them can be used in combination. As the photopolymerizable monomer, a monomer having none of benzene rings, ether bonds ($-CH_2-O-CH_2-$), and polar groups such as an $-OH$ group and a $-COOH$ group is preferable in terms of allowing the cured product after being cured to have better weather resistance.

Mixing the isocyanate monomer with the curable composition of this embodiment allows the cured product to have better elongation properties. Examples of the isocyanate monomer to be added after the urethanization reaction include an aromatic diisocyanate monomer, an alicyclic diisocyanate monomer, and an aliphatic diisocyanate monomer. These monomers can each have one isocyanate group in the molecule, or can each have a plurality of (e.g., 2 to 4) isocyanate groups in the molecule. Examples of the aromatic diisocyanate monomer include monomers respectively of tolylene diisocyanate, diphenylmethane diisocyanate, diphenylpropane diisocyanate, triphenylmethane diisocyanate, phenylene diisocyanate, xylylene diisocyanate, naphthalene diisocyanate, and tolidine diisocyanate. Examples of the alicyclic diisocyanate monomer include monomers respectively of hydrogenated tolylene diisocyanate, hydrogenated diphenylmethane diisocyanate, hydrogenated xylylene diisocyanate, cyclohexylylene diisocyanate, 3-isocyanatemethyl-3,5,5-trimethylcyclohexylisocyanate (isophorone diisocyanate), 3-isocyanateethyl-3,5,5-trimethylcyclohexylisocyanate, and 3-isocyanateethyl-3,5,5-triethylcyclohexylisocyanate. Examples of the aliphatic diisocyanate monomer include a hexamethylene diisocyanate monomer. The isocyanate monomer can be an adduct product, a biuret product, an isocyanurate product, or a polymeric product of at least one of the above monomers. One of these monomers can be individually used, or two or more of them can be used in combination. As the isocyanate monomer, a monomer including neither a benzene ring nor an unsaturated bond is preferable in terms of allowing the cured product after being cured to have better weather resistance.

It is preferable that the curable composition of this embodiment include no compound having a benzene ring (i.e., aromatic hydrocarbon composed of six cyclic carbon atoms) in the molecule as the urethanization reaction product (curable oligomer), the photopolymerizable monomer, or the isocyanate monomer.

The photopolymerization initiator is not particularly limited as long as it is a compound that generates radicals by irradiated light (e.g., ultraviolet rays). Examples of the photopolymerization initiator include an acetophenone-based photoinitiator, a benzoin-based photoinitiator, a benzophenone-based photoinitiator, a thioxanthone-based photoinitiator, and an acylphosphine oxide-based photoinitiator. As the photopolymerization initiator, a commercially available product can be used.

The curable composition of this embodiment can include a photosensitizer, a polymerization inhibitor, an antioxidant, a dye, a pigment, a phosphor, or the like as appropriate.

The curable composition of this embodiment preferably includes 10 mass % or more of the compound represented by the general formula (1). This allows it to be more sufficiently cured by both light and moisture. The curable composition of this embodiment can include 90 mass % or less of the curable oligomer represented by the general formula (1). The curable composition of this embodiment can include 10 mass % or more of a photopolymerizable monomer (that does not undergo a urethanization reaction) such as the saturated cycloalkyl(meth)acrylate monomer or the saturated chain alkyl (meth)acrylate monomer, and can include 85 mass % or less of the same. The curable composition of this embodiment can include 2 mass % or more of an isocyanate monomer other than the curable oligomer above, and can include 20 mass % or less of the same.

Next, an embodiment of a method for producing the curable composition according to the present invention will be described.

In the method for producing the curable composition according to this embodiment, for example, a curable composition including a urethanization reaction product is produced by a urethanization reaction under the presence of: the branched polyolefin diol (the component A); at least one selected from the isocyanurate product, the adduct product, and the biuret product, of the aliphatic diisocyanate having 6 to 10 total carbon atoms (the component B); and the hydroxy saturated $C_1$ to $C_4$ alkyl (meth)acrylate (the component C).

Specifically, the method for producing the curable composition of this embodiment includes a reacting step of synthesizing the urethanization reaction product including the curable oligomer by the urethanization reaction under the presence of the component A, the component B, the component C, and the urethanization reaction catalyst. The method for producing the curable composition of this embodiment further includes an adding step of further adding the photopolymerizable monomer, the isocyanate monomer, and the photopolymerization initiator, after the reacting step.

The component A, the component B, the component C, and the urethanization reaction catalyst used in the reacting step are as described above.

In the producing method, the reacting step is generally performed after air in a reaction vessel is replaced with nitrogen, in order to prevent reaction with moisture.

In the reacting step, general reaction conditions suitable for the urethanization reaction can be employed. Preferably, in the reacting step, the urethanization reaction is carried out by maintaining a temperature of 50 to 70° C. for 0.5 to 3 hours.

In the reacting step, the preferable ratios (molar ratios) of the mixing amounts of the component A, the component B, and the component C are as described above.

In the reacting step, a compound that is not involved in the urethanization reaction and produces a polymerization reaction product by being irradiated with light can further coexist. Examples of such a compound include the photopolymerizable monomers such as the saturated cycloalkyl (meth)acrylate monomer or the saturated chain alkyl(meth) acrylate monomer, as described above.

In the adding step, the photopolymerizable monomer, the isocyanate monomer, and the photopolymerization initiator as described above can be further added after the urethanization reaction. The photopolymerizable monomer and the isocyanate monomer to be further added have low viscosity, and thus each serve as a solvent for diluting the curable oligomer, and also serve to more sufficiently cure the cured product as they themselves are cured by light or moisture. Further including the photopolymerizable monomer and the isocyanate monomer results in a low viscosity of the curable composition for curing, thereby simplifying the step of applying the curable composition.

In the adding step, a photosensitizer, a polymerization inhibitor, an antioxidant, a dye, a pigment, a phosphor, and the like may be further included as appropriate.

The curable composition of this embodiment is used as a cured product cured by being irradiated with light such as ultraviolet rays. For example, an electronic circuit to be coated is coated with the curable composition described above, and then irradiated with light such as ultraviolet rays to cure the composition, so that a coating film of the cured product is formed. Further, the film is left to stand in air for several hours to several days to allow a curing reaction by moisture in the air to proceed.

As the light for irradiation to allow a curing reaction to proceed, ultraviolet rays can be used. Examples of a light source that can be used include a high-pressure mercury lamp, a metal halide lamp, a xenon lamp, a chemical lamp, and an LED lamp. As an irradiation intensity, for example, 10 to 10,000 mW/cm$^2$ can be employed.

In order to allow a curing reaction by moisture to further proceed, it is preferable that the temperature of air in which the film is left to stand be 20 to 40° C., and the humidity of the air be 40 to 90% RH.

Examples of the object to be coated by applying the curable composition thereto include an electronic circuit or a terminal on a mounting board used for precision devices, an electronic circuit or a terminal on a mounting board mounted on automobiles, bicycles, railway trains, aircraft, ships, or the like, an electronic circuit or a terminal on a mounting board used for mobile devices (e.g., cell phones, digital cameras, digital video cameras), an electronic circuit or a terminal on a board used for outdoor equipment (e.g., water heaters, air conditioner outdoor units), and an electronic circuit or a terminal on a mounting board used for water-use equipment such as laundry machines, electronic bidets, or dishwasher dryers.

The curable composition and the method for producing the composition, of this embodiment are as exemplified above, but the present invention is not limited to the above exemplified curable composition and method for producing the composition. That is, various forms used in general curable compositions and methods for producing the compositions can be employed without impairing the effect of the present invention.

EXAMPLES

Next, the present invention will be described in more detail by way of experimental examples, but the present invention is not limited thereto.

As described below, a urethanization reaction was undergone by mixing (A) to (C) to produce a curable composition including the curable oligomer represented by the general formula (1).

<Raw Materials in Reacting Step>
- (A) Branched polyolefin diol
  - (A-1) Hydrogenated polybutadienediol (average molecular weight of 1,500)
    Product name "NISSO-PB GI-1000"
    : Hydroxyl value (KOHmg/g=67 mg) manufactured by Nippon Soda Co., Ltd.
  - (A-2) Hydrogenated polybutadienediol (average molecular weight of 2.000)
    Product name "NISSO-PB GI-2000"
    : Hydroxyl value (KOHmg/g=50 mg) manufactured by Nippon Soda Co., Ltd.
  - (A-3) Hydrogenated polybutadienediol (average molecular weight of 3,100)
    Product name "NISSO-PB GI-3000"
    : Hydroxyl value (KOHmg/g=30 mg) manufactured by Nippon Soda Co., Ltd.
- (B) Derivative of an aliphatic diisocyanate having 6 to 10 total carbon atoms
  - (B-1) Isocyanurate derivative of hexamethylene diisocyanate (HMDI)
    Product name "DURANATE TSR-100: Isocyanate group content of 20.4%" manufactured by ASAHI KASEI CORPORATION
  - (B-2) Isocyanurate derivative of hexamethylene diisocyanate (HMDI)
    Product name "DURANATE TPA-100: Isocyanate group content of 23.0%" manufactured by ASAHI KASEI CORPORATION
- (C) Hydroxy saturated C1 to C4 alkyl (meth)acrylate
  2-hydroxyethyl acrylate (abbreviated as HEA, commercially available product) (Others)
  Photopolymerizable monomer (reaction solvent/diluent) (isobornyl acrylate, abbreviated as IBXA, commercially available product)
  Urethanization reaction catalyst (dibutyltin dilaurate, commercially available product)
<Raw Materials in Adding Step>
  Photopolymerizable monomer: Saturated cycloalkyl (meth)acrylate monomer (isobornyl acrylate, abbreviated as IBXA, commercially available product)
  Photopolymerizable monomer: Saturated chain (saturated branched) alkyl (meth)acrylate monomer (isononyl acrylate, abbreviated as INAA, commercially available product)
  Multifunctional isocyanate
    Isocyanurate derivative of hexamethylene diisocyanate (HMDI)
      Above (B-1) Product name "DURANATE TSR-100" manufactured by ASAHI KASEI CORPORATION
      Above (B-2) Product name "DURANATE TPA-100" manufactured by ASAHI KASEI CORPORATION
  Fluorescent dye: Product name "Tinopal OB" manufactured by BASF Japan Ltd.
  Photopolymerization initiator: Product name "IRGACURE 907" manufactured by IGM Resins B.V.
  Photosensitizer (2,4-diethylthioxanthone)
    Product name "KAYACURE DETX-S" Nippon Kayaku Co., Ltd.

Example 1

A urethanization reaction was undergone at 60° C. for one hour under the presence of the above (A), (B), (C), the reaction solvent, and the reaction catalyst in the mixing amounts shown in Table 1 to perform the reacting step. Next, the above raw materials in the mixing amounts shown in Table 1 were added to the composition after the reacting step and mixed to perform the adding step. Thus, a curable composition was produced.

Examples 2 to 8

Curable compositions were produced in the same manner as in Example 1, except that the mixing compositions were changed to the corresponding ones shown in Table 1 in the adding step. In Examples 2 to 7, the reacting step was performed in volume ratios each in which the —NCO group is excessive in the urethanization reaction, while in Example 8, the reacting step was performed in a volume ratio in which all —NCO groups can be urethane bonded in the urethanization reaction.

The composition of Example 1 before the reacting step and after the reacting step was subjected to FT-IR analysis. FIG. 1 shows each IR chart. In FIG. 1, the upper chart represents the composition before the reacting step, and the lower chart represents the composition after the reacting step. It was confirmed from the IR chart of the reaction product generated by the reacting step that the compound shown in the general formula (1) was synthesized.

Comparative Examples 1 and 2

Curable compositions were obtained in the same manner as in Example 1 at the mixing composition shown in Table 1, except that isobornyl acrylate and isononyl acrylate were not used in combination and isobornyl acrylate was used as a photopolymerizable monomer.

Table 1 shows the mixing compositions for producing the curable compositions of Examples 1 to 8 and Comparative Examples 1 and 2.

TABLE 1

|  |  |  |  | Ex. 1 | Ex. 2 | Ex. 3 | Ex. 4 | Ex. 5 |
|---|---|---|---|---|---|---|---|---|
| Reacting step | Curable oligomer | Branched polyolefin diol (component A) | GI-1000 | 100 | 100 | 100 | 0 | 0 |
|  |  |  | GI-2000 | 0 | 0 | 0 | 0 | 0 |
|  |  |  | GI-3000 | 0 | 0 | 0 | 100 | 100 |
|  |  | Isocyanate monomer (isocyanurate) (component B) | TSR-100 | 73.8 | 73.8 | 73.8 | 32.3 | 32.3 |
|  |  |  | TPA-100 | 0 | 0 | 0 | 0 | 0 |
|  |  | Hydroxy saturated alkyl (meth)acrylate (component C) | HEA | 13.9 | 13.9 | 13.9 | 6.1 | 6.1 |
|  | Photopolymerizable monomer |  | IBXA | 125 | 125 | 125 | 138 | 138 |
|  | Urethanization catalyst |  | Dibutyltin dilaurate | 0.019 | 0.019 | 0.019 | 0.0069 | 0.0042 |
|  |  | Subtotal |  | 313 | 313 | 313 | 277 | 277 |
| Acting step | Photopolymerizable monomer |  | IBXA | 410 | 326 | 213 | 255 | 50 |
|  |  |  | INAA | 59 | 113 | 145 | 98 | 47 |
|  | Isocyanate monomer (isocyanurate) |  | TSR-100 | 87 | 83.5 | 74.6 | 70 | 41.6 |
|  |  |  | TPA-100 | 0 | 0 | 0 | 0 | 0 |
|  | Fluorescent dye |  | Tinopal OB | 0.45 | 0.43 | 0.39 | 0.36 | 0.21 |
|  | Photopolymerization initiator |  | IRGACURE 907 | 26 | 25 | 22 | 21 | 12 |
|  | Photosensitizer |  | DETX-S | 4.4 | 4.2 | 3.7 | 3.5 | 2.1 |
|  |  | Grand total |  | 900 | 865 | 771 | 724 | 429 |
|  |  | IBXA/INAA mass ratio |  | 9/1 | 8/2 | 7/3 | 8/2 | 8/2 |

|  |  |  |  | Ex. 6 | Ex. 7 | Ex. 8 | C. Ex. 1 | C. Ex. 2 |
|---|---|---|---|---|---|---|---|---|
| Reacting step | Curable oligomer | Branched polyolefin diol (component A) | GI-1000 | 100 | 0 | 0 | 100 | 100 |
|  |  |  | GI-2000 | 0 | 0 | 0 | 0 | 0 |
|  |  |  | GI-3000 | 0 | 100 | 100 | 0 | 0 |
|  |  | Isocyanate monomer (isocyanurate) (component B) | TSR-100 | 0 | 0 | 0 | 73.8 | 0 |
|  |  |  | TPA-100 | 65.4 | 28.7 | 28.7 | 0 | 65.4 |
|  |  | Hydroxy saturated alkyl (meth)acrylate (component C) | HEA | 13.9 | 6.1 | 12.2 | 13.9 | 13.9 |
|  | Photopolymerizable monomer |  | IBXA | 179 | 135 | 141 | 125 | 179 |
|  | Urethanization catalyst |  | Dibutyltin dilaurate | 0.0063 | 0.0053 | 0.0053 | 0.019 | 0.0063 |
|  |  | Subtotal |  | 359 | 270 | 282 | 313 | 359 |
| Acting step | Photopolymerizable monomer |  | IBXA | 112 | 117 | 122 | 626 | 294 |
|  |  |  | INAA | 73 | 63 | 66 | 0 | 0 |
|  | Isocyanate monomer (isocyanurate) |  | TSR-100 | 0 | 0 | 0 | 104 | 0 |
|  |  |  | TPA-100 | 60.5 | 50 | 0 | 0 | 72.6 |
|  | Fluorescent dye |  | Tinopal OB | 0.31 | 0.26 | 0.25 | 0.54 | 0.36 |
|  | Photopolymerization initiator |  | IRGACURE 907 | 18 | 15 | 14 | 31 | 22 |
|  | Photosensitizer |  | DETX-S | 3.0 | 2.5 | 2.3 | 5.2 | 3.6 |
|  |  | Grand total |  | 626 | 518 | 496 | 1080 | 752 |
|  |  | IBXA/INAA mass ratio |  | 8/2 | 8/2 | 8/2 | 10/0 | 10/0 |

Each of the curable compositions produced in Examples and Comparative Examples was evaluated as described below. Specifically, volume resistivity and tensile elongation of the cured product of each of the curable compositions produced were investigated. In general, the higher the tensile elongation, the more the strain (caused by difference in the thermal expansion coefficients between the cured product and the board) at the time of cooling can be alleviated to suppress the resulting cracks from occurring; thus, such a cured product has high heat and cold reliability.

<Curing>

A tin plate having a size of 0.3×130×180 mm was coated with each of the compositions so that the thickness of the cured product after being cured was 100 μm. Further, the compositions were irradiated with ultraviolet rays by a 500 W UV lamp so that the integrated light amount reaches 3000 mJ/cm$^2$ light intensity. The obtained samples were further left to stand in a constant temperature and humidity chamber at 25° C. and 60% RH for three days.

<Volume Resistivity>

A paste-like silver conductive coating material was applied in a circular shape (with a diameter of 30 mm) to each of the cured products cured as above. The material was allowed to dry at 60° C. for 30 minutes to form an upper electrode. On the other hand, the tin plate arranged on an opposite side of each of the cured products served as a lower electrode. A voltage of DC 100 V was applied, and a resistance value after 60 seconds was obtained. Then, the volume resistivity was obtained by multiplying the area of the electrodes by the resistance value, and then dividing the obtained value by the thickness of the cured product (cured film).

<Tensile Elongation>

A PET film that has been subjected to release treatment was coated with each of the compositions so that the thickness of the cured product after being cured was 100 μm. Further, the compositions were irradiated with ultraviolet rays by a 500 W UV lamp so that the integrated light amount reaches 3,000 mJ/cm$^2$ light intensity, followed by being left to stand in a constant temperature and humidity chamber at 25° C. and 60% RH for three days. Subsequently, the cured product film was peeled off from the PET film and cut into a dumbbell No. 2 shape to measure the tensile elongation. The measurement conditions were: the distance between the chucks of 20 mm, and the tensile speed of 300 mm/min.

Table 2 shows the evaluation results of the volume resistivity and the tensile elongation of the cured products after being cured. The oligomer ratio in Table 2 is a ratio of the curable oligomer in the curable composition, and is a value calculated from the mixing ratio upon the confirmation that the yield of the urethanization reaction in the reacting step is 100%.

TABLE 2

|  | Ex. 1 | Ex. 2 | Ex. 3 | Ex. 4 | Ex. 5 | Ex. 6 | Ex. 7 | Ex. 8 | C. Ex. 1 | C. Ex. 2 |
|---|---|---|---|---|---|---|---|---|---|---|
| Oligomer ratio [mass %] | 21 | 22 | 24 | 19 | 32 | 29 | 26 | 28 | 17 | 24 |
| Composition viscosity [mPa · s] | 100 | 100 | 100 | 100 | 500 | 500 | 500 | 500 | 100 | 500 |
| After curing | | | | | | | | | | |
| Volume resistivity [Ω-cm] | 1.5E+15 | 1.6E+15 | 4.3E+13 | 2.6E+15 | 4.8E+14 | 2.3E+15 | 4.7E+15 | 7.7E+15 | 1.2E+15 | 3.0E+15 |
| Tensile elongation [%] | 59 | 215 | 166 | 293 | 248 | 160 | 125 | 113 | 93 | 23 |

As can be understood from the evaluation results shown in Table 2, the curable composition of each of the Examples could obtain a cured product having both good electrical insulation properties and good elongation properties. On the other hand, the cured product obtained from the curable composition of each of the Comparative Examples failed to have both good electrical insulation properties and good elongation properties. As additional remarks on the above results, the tensile elongation of the cured product tended to increase when the ratio of the saturated chain alkyl (meth)acrylate monomer to the saturated cycloalkyl(meth)acrylate monomer increases among the photopolymerizable monomers. As the polyfunctional isocyanate, use of "DURANATE TSR-100", which is the raw material above, tended to result in a higher tensile elongation of the cured product than in the case where "DURANATE TPA-100" was used. On the other hand, use of "DURANATE TPA-100", which is the raw material above, tended to result in a higher volume resistivity of the cured product than in the case where "DURANATE TSR-100" was used.

Industrial Applicability

The curable composition of the present invention is, for example, applied to an electronic circuit, then irradiated with light for curing, and suitably used as a cured product to coat the electronic circuit with a cured product. The curable composition of the present invention is suitably used, for example, as a curable composition for an insulating coating.

The invention claimed is:

1. A curable composition comprising:
    a curable oligomer having, in its molecule, a branched polyolefin structure and a (meth)acryloyl group;
    a saturated cycloalkyl (meth)acrylate monomer having, in its molecule, a saturated cyclic hydrocarbon structure and a (meth)acryloyl group;
    a saturated chain alkyl (meth)acrylate monomer having, in its molecule, a saturated chain hydrocarbon structure and a (meth)acryloyl group, and
    an isocyanate monomer having, in its molecule, one or more isocyanate groups.

2. The curable composition according to claim 1, wherein the saturated chain alkyl (meth)acrylate monomer is a saturated branched alkyl (meth)acrylate monomer having, in its molecule, a saturated branched hydrocarbon structure and a (meth)acryloyl group.

3. The curable composition according to claim 1, wherein the saturated chain alkyl (meth)acrylate monomer is a (meth)acrylate monomer comprising saturated chain hydrocarbon having 9 or more and 12 or less carbon atoms.

4. The curable composition according to claim 1, wherein a ratio of the saturated cycloalkyl (meth)acrylate monomer to 100 parts by mass of a total mass of the saturated cycloalkyl (meth)acrylate monomer and the saturated chain alkyl (meth)acrylate monomer is 70 parts or more and 95 parts or less by mass.

5. The curable composition according to claim 2, wherein the saturated chain alkyl (meth)acrylate monomer is a (meth)acrylate monomer comprising saturated chain hydrocarbon having 9 or more and 12 or less carbon atoms.

6. The curable composition according to claim 2, wherein a ratio of the saturated cycloalkyl (meth)acrylate monomer to 100 parts by mass of a total mass of the saturated cycloalkyl (meth)acrylate monomer and the saturated chain alkyl (meth)acrylate monomer is 70 parts or more and 95 parts or less by mass.

7. The curable composition according to claim 3, wherein a ratio of the saturated cycloalkyl (meth)acrylate monomer to 100 parts by mass of a total mass of the saturated cycloalkyl (meth)acrylate monomer and the saturated chain alkyl (meth)acrylate monomer is 70 parts or more and 95 parts or less by mass.

8. The curable composition according to claim 5, wherein a ratio of the saturated cycloalkyl (meth)acrylate monomer to 100 parts by mass of a total mass of the saturated cycloalkyl (meth)acrylate monomer and the saturated chain alkyl (meth)acrylate monomer is 70 parts or more and 95 parts or less by mass.

* * * * *